W. E. PRALL.
Improvement in Steam Water-Elevators.
No. 5,715. Reissued Dec. 30, 1873.
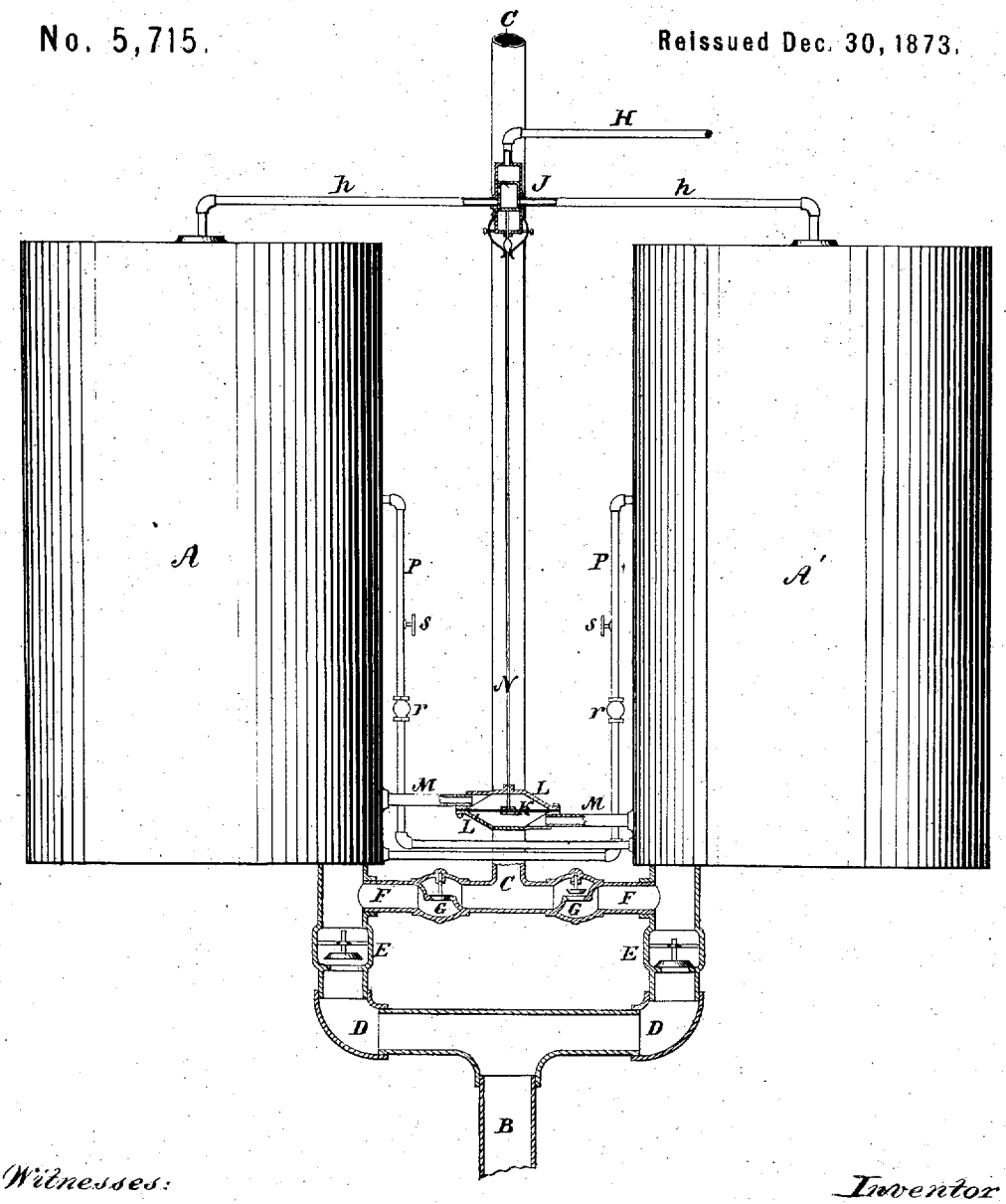
Witnesses:
Wm. H. Rowe
E. P. Davidson
Inventor:
William E. Prall
By David A. Burr
Atty.

UNITED STATES PATENT OFFICE.

WILLIAM E. PRALL, OF WASHINGTON, DISTRICT OF COLUMBIA.

IMPROVEMENT IN STEAM WATER-ELEVATORS.

Specification forming part of Letters Patent No. 121,962, dated December 19, 1871; reissue No. 5,138, dated November 5, 1872; reissue No. 5,715, dated December 30, 1873; application filed November 21, 1873.

*To all whom it may concern:*

Be it known that I, WILLIAM EDGAR PRALL, of the city of Washington, in the District of Columbia, have invented certain Improvements in Steam Water-Elevators, of which the following is a specification:

My invention relates to an improvement upon the invention set forth in the Letters Patent granted to me July 4, 1871, No. 116,751, reissued October 29, 1872, No. 5,123. It consists in combining, with two chambers of the apparatus, a movable partition so interposed in a suitable way or passage communicating with the interior of each chamber as that it will be moved, by an exhaust of steam from or its condensation within either chamber, toward said chamber, and by such movement cause an exclusion of steam from that chamber and its admission to the opposite one; the object of my said invention being to utilize the sudden reduction of pressure produced alternately in the two chambers in the customary operation of the pump for the purpose of controlling thereby automatically, as set forth, the admission of steam thereto.

The accompanying drawing, which illustrates my invention, represents, partly in section, a double-acting pump having my improvement combined therewith.

A A′ are cylinders, constituting the chambers of the pump, and having a common suction-pipe, B, and discharge-pipe C. D D are branch pipes, forming a connection between the bottom of each chamber and the single suction-pipe B, and E E are check-valves fitted in said branch inlet-pipes. F F are branch pipes, forming a connection between the bottom of each chamber and the discharge-pipe C, and G G are check-valves fitted in said branch outlet-pipes. Instead of being connected directly to each chamber, these pipes are respectively fitted, each to one of the pipes D D, between its check-valve and the chamber into which it opens, so that the two pipes D and F have a common opening into said chamber. H is a steam-pipe extending to a suitable boiler or steam-generator, and fitted with branch pipes *h h*, extending to and opening centrally into the top of each chamber. J is a two-seated steam-valve placed at the intersection of the branch pipes *h h* with the main steam-pipe H, to govern the connection of said main pipe with its branches, so that when communication with one branch is opened the supply of steam to the other shall be cut off, and vice versa. K is a movable partition, confined at its edges between an upper and a lower plate, L and L′, which form a casing therefor, said plates being concaved or hollowed out on their inner sides sufficiently to permit the center of the partition to move between them to an extent proportioned to the amount of play required in the movement of the valve J. M M are small pipes connecting, respectively, the space or compartment on one side of the movable partition K with the lower portion of one chamber, and the space or compartment on the other side of the movable partition with the lower portion of the other chamber. The movable partition thus placed in the channel of communication, which would otherwise be open between the chambers A A′, through the connecting-pipes M M and casing L L′, operates to cut off or close this way of communication, and serves, in fact, as a movable partition, playing between the interiors of said chambers, under the influence of a reduction of pressure produced within the one and the other. The said movable partition is rigidly connected to the steam-valve J by means of a rod, N, so adjusted in length as that, when the movable partition is forced toward either chamber, the admission of steam to that chamber shall be cut off by said valve, and the steam-port into the other chamber be thereby thrown open. P P are small pipes extending, respectively, from the lower portion of one chamber to the upper part of the other. Each pipe is provided with a check-valve, *r*, opening upward, to permit a flow of water in one direction only, and also with a stop-valve, *s*, by which it may be more or less closed.

To operate the pump thus constructed, steam is admitted through the steam-pipe H, and, passing into the one chamber or the other, as the one port or the other is open, forces out the water contained therein. So soon, however, as the water under this pressure is so far discharged from the chamber as to admit a vent of steam through the discharge-port into the discharge-pipe, an instant reduction of pressure thereby takes place within the chamber, because of the exhaust of the steam, and its consequent condensation. This sudden reduction or removal of pressure no sooner takes place in the one chamber, and upon the one side of the movable partition, than the excess of pressure upon the opposite side of said partition will cause it to move instantly, and thus operate to cut off steam from the exhausted chamber, and admit it to the opposite one. The pressure of steam admitted to the latter chamber will not only produce and complete a discharge of water therefrom, but will also force a jet of water through the small connecting-pipe P into the empty chamber A, facilitating and hastening the condensation of the steam in the latter, and the consequent production of the vacuum required to obtain a flow of water thereinto from the suction-pipe. The flow through the connecting-pipe P will operate also, so soon as the chamber A has filled, to equalize the pressure upon the two sides of the movable partition, and this equalization of pressure will be maintained until the discharging-chamber is emptied, and the pressure upon the corresponding side of the movable partition suddenly reduced, in manner as above described.

The two chambers in this apparatus are thus alternately filled and emptied by means, first, of an alternate admission and exclusion of steam to and from the one and the other automatically, produced by the movements of the movable partition K, under the influence of a reduction of pressure in either chamber; and, second, by an alternate condensation of steam in the one and in the other, started by the passage of the steam into the discharge-pipe, and continued by the inflow of water from the suction-pipe, assisted, furthermore, if desired, by an injection, automatically produced, at the proper moment, through the pipes P, by means of the excess of pressure in the discharging-chamber.

I claim as my invention—

1. The method, substantially as herein described, of controlling the admission of steam to a double-acting steam vacuum-pump, by combining, with the steam-induction ports of the pump, a movable partition, placed in a channel of communication between its chambers, and actuated by means of an exhaust of steam through or its condensation at or within the discharge-port of either chamber, substantially as set forth.

2. A movable partition placed in a channel of communication between the chambers or cylinders of a double-acting steam vacuum-pump, and combined with a valve or valves, to control the admission of steam to said chambers, substantially as herein set forth.

W. E. PRALL.

Witnesses:

ROBT. G. LOUGHERY,
DAVID A. BURR.